US008243608B2

(12) United States Patent
Tausanovitch et al.

(10) Patent No.: US 8,243,608 B2
(45) Date of Patent: Aug. 14, 2012

(54) METRO ETHERNET CONNECTIVITY FAULT MANAGEMENT ACCELERATION

(75) Inventors: Nicolas Tausanovitch, Windham, NH (US); Michael Craren, Holliston, MA (US); Hamid Assarpour, Arlington, MA (US)

(73) Assignee: Rockstar Bidco, LP, New York, NY (US)

( * ) Notice: Subject to any disclaimer, the term of this patent is extended or adjusted under 35 U.S.C. 154(b) by 729 days.

(21) Appl. No.: 12/345,815

(22) Filed: Dec. 30, 2008

(65) Prior Publication Data
US 2010/0169718 A1 Jul. 1, 2010

(51) Int. Cl.
*H04L 12/26* (2006.01)

(52) U.S. Cl. ...................... 370/241.1; 370/244
(58) Field of Classification Search .......... 370/242–245, 370/252, 253
See application file for complete search history.

(56) References Cited

U.S. PATENT DOCUMENTS
2009/0279542 A1* 11/2009 Wong et al. .................. 370/389

OTHER PUBLICATIONS

O'Connor, D, Ethernet Service OAM: Overview, Applications, Deployment, and Issues,Optical Fiber Communication Conference, 2006 and the 2006 National Fiber Optic Engineers Conference. OFC 2006, Mar. 5, 2006, p. 10-28.
Finn, Norman, CFM Issues, IEEE 802.1 Plenary, Jul. 2007, p. 1-54.
Nortel Networks, Ethernet Now Offers the Most Comprehensive OAM for Packet-based Solutions, Whitepaper: Ethernet and OAM, Nov. 2006, p. 1-6.
Sridhar, Kamakshi et al., End-to-End Ethernet Connectivity Fault Management in Metro and Access Networks, Technology White Paper, Jun. 28, 2005, p. 1-12.

* cited by examiner

*Primary Examiner* — Pao Sinkantarakorn
(74) *Attorney, Agent, or Firm* — Guerin & Rodriguez, LLP; Michael A. Rodriguez (57) ABSTRACT

A network element disposed at an edge of a connectivity fault management (CFM) domain includes a switch fabric, a central processor (CP) card, and a line card in communication with the CP card through the switch fabric. The line card includes an Ethernet interface for transmitting and receiving Ethernet CFM frames over a network and circuitry configured to generate new continuity check messages (CCMs) periodically, to process CCMs received on each connection supported by the line card, and to detect a loss of continuity for any of the connections supported by the line card. The line card maintains a list of supported connections. A generate timer and an age counter are associated with each connection in the list. The line card generates a CCM for a given connection when the generate timer expires and detects a loss of continuity for the given connection when its age counter exceeds a threshold.

16 Claims, 11 Drawing Sheets

| INTVL CODE (binary) | CCM INTERVAL | TIMER LSB | PRELOAD VALUE |
|---|---|---|---|
| 001 | 3.33MS | 10US | 0X14D |
| 010 | 10MS | 40US | 0X0FA |
| 011 | 100MS | 320US | 0X138 |
| 100 | 1S | 2.56MS | 0X186 |
| 101 | 10S | 20.48MS | 0X1E8 |

174, 176, 178, 180 (column headers); 172-1, 172-2, 172-3, 172-4, 172-5 (rows)

METRO ETHERNET CONNECTIVITY FAULT MANAGEMENT ACCELERATION

FIELD OF THE INVENTION

The invention relates generally to connectivity fault management in Ethernet networks. More particularly, the invention relates to systems and methods for generating and processing connectivity check messages.

BACKGROUND

With the advent of connection-oriented forwarding technologies such as Provider Backbone Transport (PBT) and Provider Backbone Bridge (PBB), Ethernet is rapidly becoming a dominant broadband technology, particularly in metro networks and wide-area networks. With PBT, service providers are able to establish point-to-point and point-to-multipoint Ethernet tunnels and to specify paths that service traffic will take through their Ethernet networks. With PBB, service providers are able to separate a communications network into customer domains and service provider domains. The separation is achieved by encapsulating the customer packets within a backbone (i.e., service provider) MAC (Media Access Control) header. Network elements in the service provider domain forward packets based on the service provider MAC header while the customer header remains invisible except at the edge of the service provider domain.

As Ethernet services proliferate, service providers require a robust set of operation, administration, and maintenance (OAM) tools to manage their Ethernet networks and to adapt the Ethernet technology to a carrier-grade service environment. To this end, the IEEE (Institute of Electrical and Electronics Engineers) organization has formalized a standards document for connection fault management in Ethernet networks, referred to as IEEE 802.1ag (also known as Connectivity Fault Management or CFM). The ITU-T Recommendation Y.1731 also defines OAM functions and mechanisms for Ethernet-based networks much like the 802.1ag standard. In general, such standards specify managed objects, protocols, and procedures for, among other things, detecting and diagnosing connectivity faults in end-to-end Ethernet networks. Defined CFM mechanisms for fault detection include continuity check, linktrace (traceroute), loopback (ping), and alarm indication at different levels or domains (e.g., customer level, service provider level, and operator level).

The IEEE 802.1ag standard also defines various CFM entities and concepts, including maintenance domains, maintenance associations, and maintenance association end points. According to IEEE 802.1ag, a maintenance domain (MD) is "the network or the part of the network for which faults in connectivity can be managed", a maintenance association end point (MEP) is "an actively managed CFM entity" that "can generate and receive CFM PDUs" (protocol data units or frames), a maintenance association (MA) is "a set of MEPs, each configured with the same MAID (maintenance association identifier) and MD Level, established to verify the integrity of a single service instance", and a maintenance entity (ME) is "a point-to-point relationship between two MEPs within a single MA". Additional details regarding such CFM entities are available in the IEEE 802.1ag/D8.1 draft standard, the entirety of which is incorporated by reference herein.

In metro Ethernet applications, connectivity across tunnels (also called connections) between MEPs is verified continuously through continuity check (CC) messages. A network element transmits such CC messages periodically at a variable interval, which can occur as often as once every 3 milliseconds. Typically, the generating and processing of such CC messages occurs centrally, that is, by a general-purpose central processing unit on a processor card in the network element. The line cards extract the frames of the CC messages from the data path and send them to the processor card. In effect, this frame extraction and forwarding concentrates the CC messages from all line cards at this central point.

Because many connections (e.g., PBB/PBT tunnels) can terminate on a given physical interface on the network element, the central processor can become overwhelmed by the real-time processing requirements for generating and checking these CC messages. For example, a network element that supports 640 G of service traffic and has a scaling requirement of 1000 MEs per 10 G lane can thus have 64000 MEs to manage, with the corresponding CC messages converging on the single central processor. With a minimum interval for a CC message being 3.1 ms, the central processor can conceivably need to generate a CC message every 48 ns. Even the fastest of today's CPUs would not measure up to the task. Consequently, the CPU would eventually lag behind with CC message generation and checking, thus eventually leading to false indicators of lost connectivity. Alternatively, multiple general-purpose CPUs can be used in parallel, but this configuration can be impractical with respect to area, power consumption, and cost.

SUMMARY

In one aspect, the invention features a method of real-time processing of a connectivity check message. An Ethernet frame is received over a network by a line card of a network element disposed at an edge of an Ethernet connectivity fault management (CFM) domain. The line card determines that the Ethernet frame includes a continuity check message. The line card examines the continuity check message to determine whether the continuity check message contains correct connection information.

In another aspect, the invention features a method of real-time generation of a connectivity check message. A line card in a network element maintains a list of connections in an Ethernet connectivity fault management (CFM domain that are supported by the line card. The line card associates a timer with each connection in the list of connections. The line card accesses each connection in the list of connections by stepping through the list in round robin fashion, one connection during each clock cycle. The line card decrements the timer for a given connection currently being accessed and generates a continuity check message for the given connection currently being accessed if the timer associated with the given connection expires as a result of the decrementing.

In still another aspect, the invention features a network element comprising a switch fabric, a central processor (CP) card fabric, and a line card in communication with the CP card through the switch fabric. The line card includes an Ethernet interface for transmitting and receiving Ethernet connectivity fault management (CFM) frames over a network and circuitry configured to generate new continuity check messages, to process continuity check messages received on each connection supported by the line card, and to detect any loss of continuity for the connections supported by the line card.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 1 is a schematic representation of an embodiment of a maintenance domain.

DETAILED DESCRIPTION

Continuity check (CC) messaging is one of several valuable operation, administration, and maintenance (OAM) tools for managing metro Ethernet applications. Traditionally, a single CPU card within a network element centrally handled the CC messaging for each line card in the network element. For network elements constructed as described herein, the handling of the CC messaging falls to the line cards. Advantageously, distributing the CC messaging to the line cards enables network elements so constructed to scale to a greater number of simultaneous connections than are possible for those network elements that process CC messages at a central location. In addition, each line card employs hardware and firmware to generate and check CC messages, thereby achieving messaging rates unattainable using software-based message processing.

In brief overview, each line card maintains a list of supported connections. A generate timer, a receive timer, and an age counter are associated with each connection in the list. The line card generates a CC message for a given connection when the generate timer expires and detects a loss of continuity for a given connection when its age counter exceeds a threshold.

A state machine, implemented in hardware of the line card, generates CC messages for each supported connection in accordance with a variable interval associated with that connection. When the moment to generate a CC message arrives for a connection, the state machine produces a template packet. A network processor of the line card modifies the template packet to complete the CC message for subsequent transmission over the network.

On receipt of a CC message, the network processor performs various checks. Upon validating the CC message, the network processor sends a message to the state machine to signify that a valid CC message has arrived for a given connection. The state machine accesses this connection within the list of connections to modify certain timers used to maintain the aging of the connection. If a CC message for a connection is not received within a defined period, the state machine declares a loss of connectivity and initiates preparation of an exception message for delivery to the central processing card.

Figure 1:
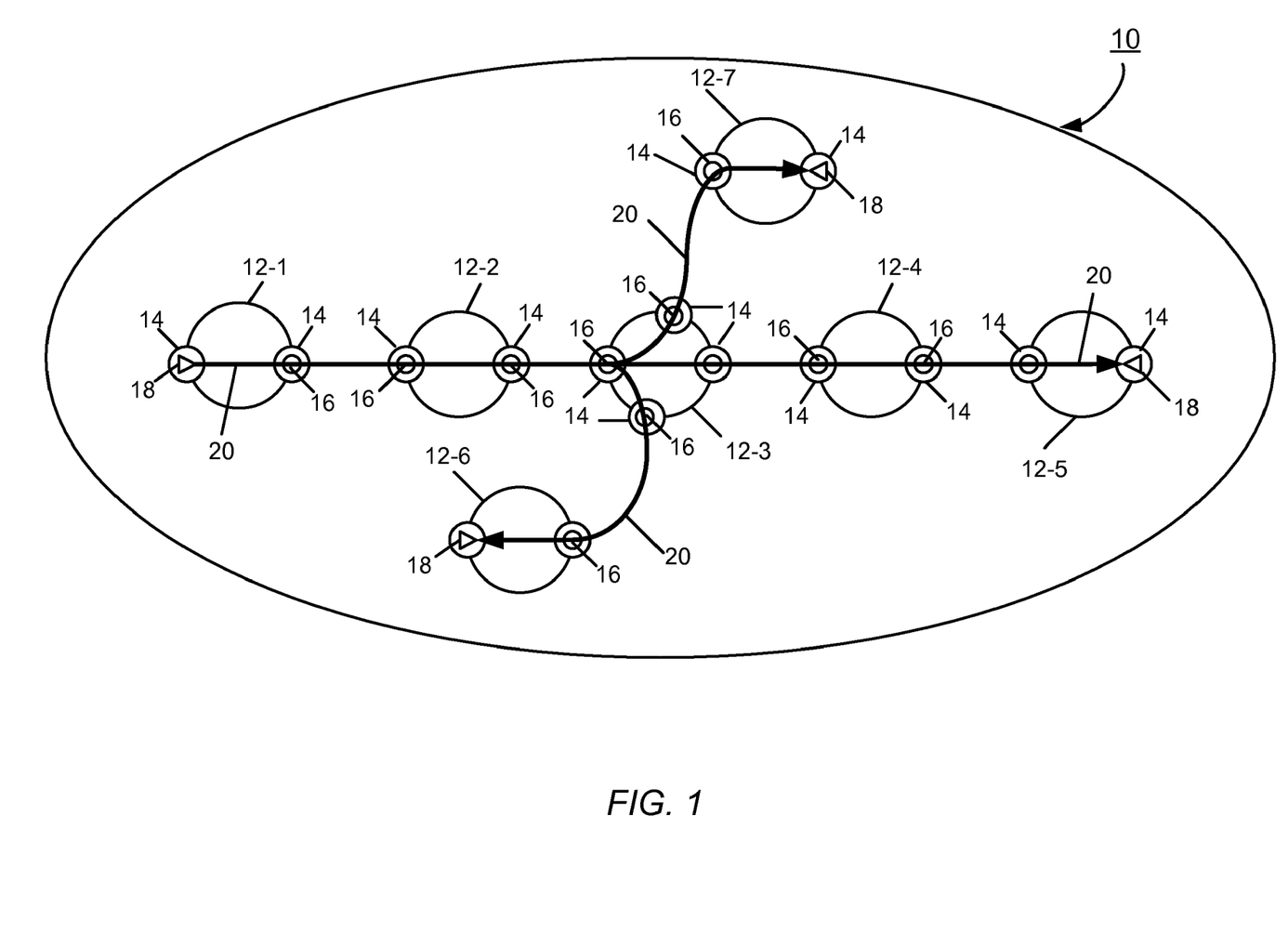

FIG. 1 shows an embodiment of a maintenance domain (MD) 10 having a plurality of network elements 12-1, 12-2, 12-3, 12-4, 12-5, 12-6, and 12-7 (generally, 12). Network elements 12 can be any type of network device, examples of which include bridges, routers, and switches. The maintenance domain 10 may be implemented using various transport technologies according to different protocols related to an end-to-end carrier-grade Ethernet service. Examples of these technologies include, but are not limited to, Ethernet over Synchronous Optical Network/Synchronous Digital Hierarchy (SONET/SDH), Ethernet over Asynchronous Transfer Mode (ATM), Ethernet over Resilient Packet Ring (RPR), Ethernet over Multiprotocol Label Switching (MPLS), and Ethernet over Internet Protocol (IP).

Each network element 12 includes Ethernet ports 14. An Ethernet port can implement multiple MEs of different types. For network elements 12-1, 12-5, 12-6, and 12-7, one of its ports 14 implements a MEP 18 and another port 14 implements a MIP (maintenance intermediate point) 16. For network elements 12-2, 12-3, and 12-4, each port 14 implements a MIP 16. In general, the MEPs 18 and MIPs 16 are software entities executing at the network element, although aspects of the CC messaging are implemented in hardware, as described in more detail below.

The MEPs 18 operate at an edge of the maintenance domain 10, whereas the MIPs 16 are inside the domain 10. Whereas MEPs 18 are active entities that system operators may use to initiate and monitor CFM activity, MIPs 16 passively receive and respond to CFM flows initiated by MEPs. Each MIP 16 and MEP 18 has a unique identifier, usually the MAC address of the interface with which the MEP or MIP is associated, that uniquely identifies the MIP or MEP in the Layer 2 network.

A MEG (maintenance entity group) includes a set of MEs that satisfy the following conditions: (1) MEs in an MEG exist in the same administrative domain and have the same ME level; and (2) MEs in an MEG belong to the same service provider VLAN (S-VLAN). MEGs can also be called point-to-point or multipoint Ethernet connections. For a point-to-point Ethernet connection, a MEG contains a single ME. For a multipoint Ethernet connection, a MEG contains n*(n−1)/2 MEs, where n is the number of Ethernet connection end points. For example, in FIG. 1, there are four Ethernet connection endpoints and, thus, six MEs (4*3/2).

In FIG. 1, the MEP 18 of the network element 12-1 periodically sends a multicast CC message 20 within the MD 10. The period of this "heartbeat" message can range from 3.1 ms to 10 s (the 802.1ag standard defines a set of discrete intervals: 3.1 ms, 10 ms, 100 ms, 1 s, and 10 s). The CC message 20 passes through the MIPs to the other MEPs in the same VLAN (virtual local area network) as the sending MEP. In FIG. 1, these other MEPs are at network elements 12-5, 12-6, and 12-7. Each MEP receiving this CC message 20 catalogs it and knows from the CC message 20 that the various maintenance associations (MAs) are functional, including all intermediate MIPs. Although not shown, these other MEPs are likewise periodically multicasting CC messages throughout the MD 10.

Each MEP 18 also performs various checks on received CC messages. For instance, if the received CC message has a MEG level that is lower than the MEG level of the receiving MEP, the MEP has detected an unexpected MEG level. When, instead, the MEG levels are the same, but the incoming CC message has a MEG ID that is different from MEG ID of the receiving MEP, the MEP has detected a mismerge. When the CC message has a correct MEG level and a correct MEG ID, but an incorrect MEP ID, the MEP has detected an unexpected MEP. When the CC message has a correct MEG level, a correct MEG ID, and a correct MEP ID, but also has a period field value that is different from the CC message transmission period of the receiving MEP, the MEP has detected an unexpected period. In addition, if three consecutive CC messages from a given MEP source are lost, the MEP declares a loss of continuity for the connection to the MEP.

Metro Ethernet networks often encompass multiple administrative domains belonging to different organizations, network operators, and service providers. The customer subscribes to the services of a provider, and the provider subscribes to the services of two or more operators. Accordingly, a service instance spans the provider network covering one or more operators. The provider has responsibility for the service from end to end, and each operator provides transport for the service across its particular sub-network.

Figure 2:
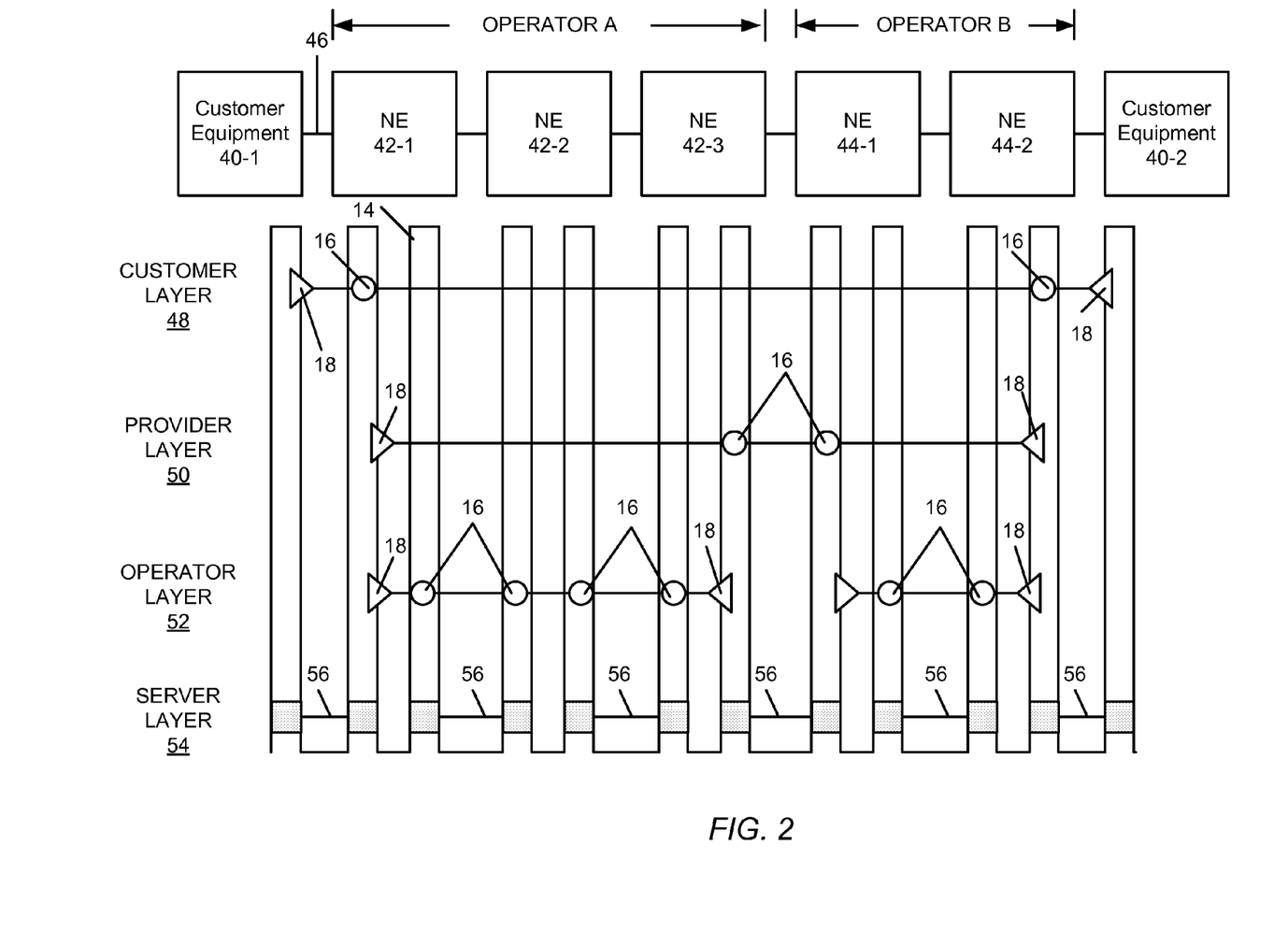
FIG. 2 is a block diagram representation of a network model of a maintenance domain.

FIG. 2 shows a multi-domain network model 30. The network model 30 includes customer equipment 40-1, 40-2 at opposite ends of the network, equipment for operator A, which includes network elements 42-1, 42-2, 42-3, and equipment for operator B, which includes network elements 44-1 and 44-2. An end-to-end path 46 extends from the customer equipment 40-1 to the customer equipment 40-2 through the equipment of the operators A and B.

The service network is partitioned into a hierarchy of levels including a customer maintenance level 48, a provider maintenance level 50, an operator maintenance level 52, and a server/transport level 54, which consists of underlying packet transport links 56. These links 56 may be single hop Ethernet links, multi-hop MPLS pseudowire, or SONET/SDH paths. Each different domain corresponds to a particular maintenance level. In general, MEPs 18 are implemented at administrative domain boundaries. FIG. 2 also shows that for a given Ethernet connection, a port 14 of the network element can implement multiple MEPs and MIPs, depending upon the number of domain levels.

Figure 3:
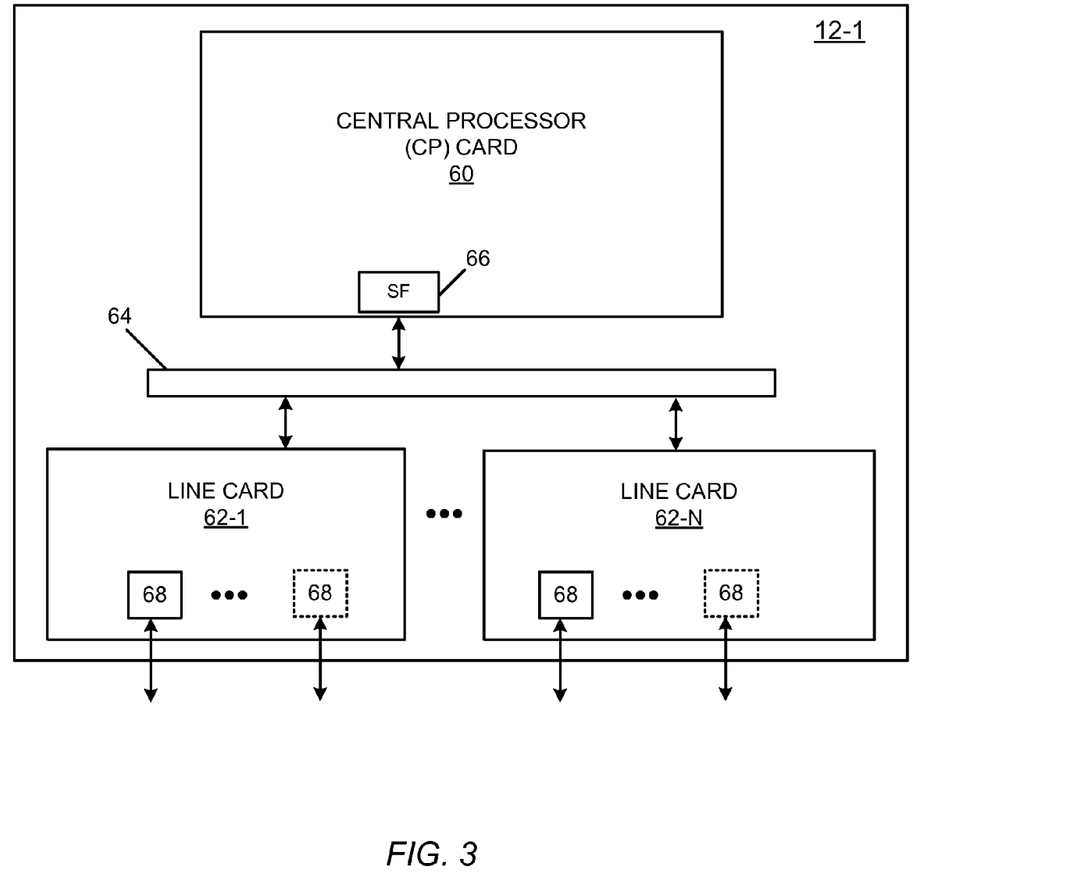
FIG. 3 is a functional block diagram of an embodiment of a network element at an edge of the maintenance domain of FIG. 1.

FIG. 3 shows an embodiment of the network element 12-1 of FIG. 1, as a representative example of network elements that are at an edge of the maintenance domain 10 and implement a MEP 18. The network element 12-1 includes a central processor (CP) card 60 in communication with a plurality of input/output modules or interface modules, referred to herein as line cards 62-1, 62-n (generally, 62) through a midplane (or backplane) 64. The CP card 60 includes a switch fabric (SF) 66 (e.g., an Ethernet switch). Although shown to be part of the CP card 60, the switch fabric 66 can alternatively be embodied on the midplane (or backplane) 64.

Each line card 62 includes one or more Ethernet ports 68 for sending and receiving Ethernet frames externally of the network element (e.g., to and from a user network, a provider network, operator network). Examples of types of line cards 62 that can be used in the practice of the invention include, but are not limited to, SFP (Small Form-Factor Pluggable)-based, Gigabit Ethernet Services modules, 1000 BaseX for SFP modules, 10 Gigabit Ethernet XFP (Gigabit Ethernet Small Form-Factor Pluggable) module, GBIC (Gigabit Interface Converter)-based Gigabit Ethernet Services Module, POS (Packet over SONET) Baseboard supporting up to 6 OC-3 or 3 OC-12 ports, 1000 BASE-T, and fixed Gigabit Ethernet.

In general, the network element 12-1 implements the IEEE 802.1ag protocol in software. Software components of the protocol for generating, transmitting, and receiving 802.1ag packets reside on the CP card 60. As described below, aspects of generating, transmitting, receiving, and processing CC messages, referred to generally as CC messaging, are implemented in hardware on each line card 62.

Figure 4:
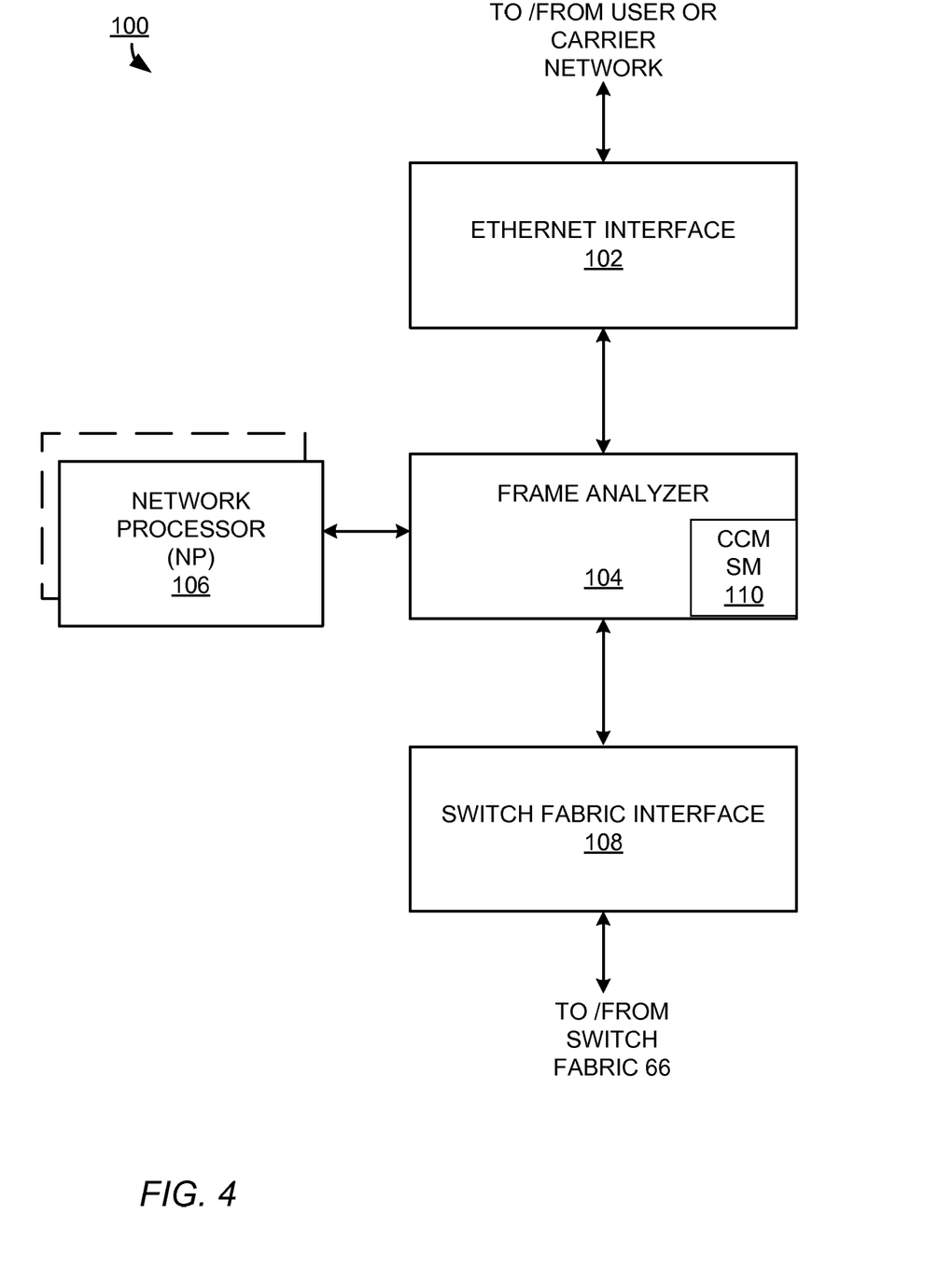
FIG. 4 is a functional block diagram of an embodiment of line card hardware including a CCM (continuity check message) state machine used to generate outgoing CC messages and to check incoming CC messages.

FIG. 4 shows a simplified embodiment of hardware architecture 100 for a data path of the line card 62-1 (as a representative example) in FIG. 3. The line card 62-1 includes a physical Ethernet interface 102 (i.e., a MAC or Media Access Control device), a frame analyzer 104, one or more network processors (also known as routing and switching processors or RSPs) 106, and a switch fabric interface 108. The Ethernet interface 102 is in communication with an external network (e.g., user network, provider network) for forwarding and receiving Ethernet frames, including 802.1ag packets, to and from the line card 62-1.

In general, the frame analyzer 104 includes a general-purpose CPU for the line card and is in communication with the Ethernet interface 102 to receive and forward 802.1ag packets therethrough. The frame analyzer 104 includes special-purpose hardware that provides a CCM state machine 110. The state machine 110 is used for periodically generating new CC messages and for checking incoming CC messages. The special-purpose hardware can be implemented with a FPGA (field programmable gate array) or an ASIC (application-specific integrated circuit). Although shown to be part of the frame analyzer 104, the CCM state machine 110 can alternatively be implemented in the physical Ethernet interface 102.

The frame analyzer 104 is in communication with each network processor 106—the number of network processors 106 on a given line card depends on the card type and number of ports 68 on the line card. Each network processor 106 corresponds to a lane that supports a number of connections. In general, a network processor 106 performs packet processing of incoming CC messages and participates in the generation of outgoing CC messages. An ASIC device with some programmability features can be used to implement the network processor 106. The switch fabric interface 106 provides a communication interface with the switch fabric 66 through which the line card 62-1 exchanges communications with the CP card 60 and other line cards 62.

Figure 5:
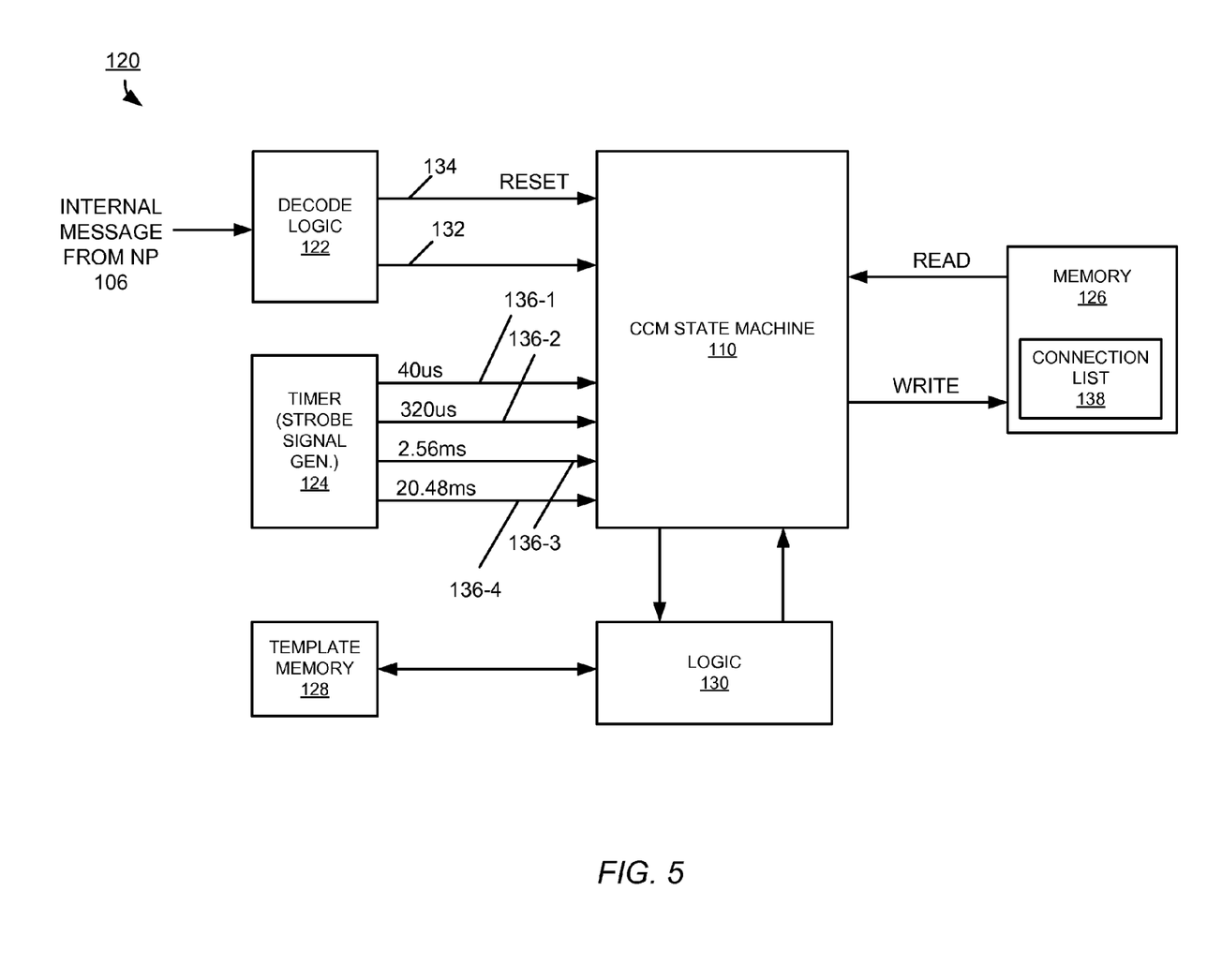
FIG. 5 is a functional block diagram of an embodiment of line card hardware used in cooperation with the CCM state machine to generate outgoing CC messages and to check incoming CC messages.

FIG. 5 shows an embodiment of hardware architecture 120 for operating the CCM state machine 110. The architecture 120 includes the CCM state machine 110, decode logic 122, a central timer (or strobe signal generator) 124, memory 126, template memory 128, and output logic 130. The decode logic 122 receives and decodes internal messages from the network processor 106 related to a received CC message to produce a ME index signal 132 and a reset signal 134 that the decode logic 122 provides to the state machine 110. The ME index signal 132 identifies a particular connection associated with the received CC message and the reset signal 134 indicates whether to reset a timer.

The central timer 124 produces four strobe signals 136-1, 136-2, 136-3, 136-4 (generally, 136), each strobe signal corresponding to a different strobe rate at which a strobe signal is sent to the CCM state machine: 40 us, 320 us, 2.56 ms, and 20.48 ms, respectively. As illustrative examples, the central timer 124 issues a strobe signal on the 320 us strobe signal line 136-2 every 320 us and a strobe signal on the 2.56 ms strobe signal line 136-3 every 2.56 ms.

The memory 126 stores a list of connections 138 for which the line card 62 generates outgoing CC messages and checks incoming CC messages. The state machine 110 reads from and writes to the list of connections 138 stored in memory 126, as described in more detail below.

The template memory 128 maintains a blank template used to generate CC messages and, optionally, exception messages. The CP card 60 stores the template in the template memory 128 upon start up of the line card 62. The output logic 130 is in communication with the template memory 128 to obtain the template and, optionally, to fill certain fields of the template with information acquired from the CCM state machine 110.

Figure 6:
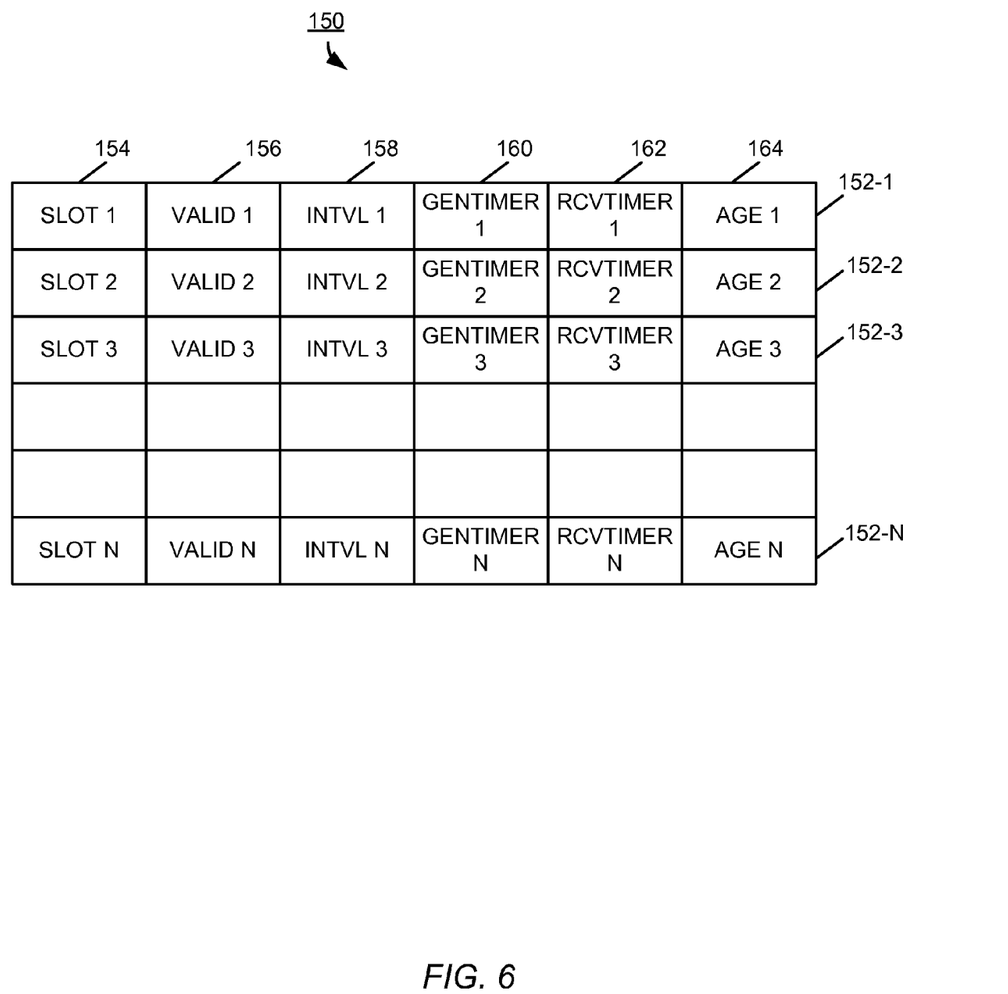
FIG. 6 is a diagram of an embodiment of a data structure used to maintain a list of connections between MEPs.

FIG. 6 shows an embodiment of a data structure 150 (here, as an example, a table) used to maintain the list of connections 138 stored in the memory 126 and accessed by the CCM state machine 110. The data structure 150 has a plurality of entries 152-1, 152-2, 152-3, 152-N (generally, 152). Each entry 152 corresponds to a different virtual connection (i.e., an ME) between MEPs and includes a connection identifier (or slot ID) 154, a valid field 156, an interval field 158, a generate timer 160 (called gentimer), a receive timer 162 (called rcvtimer), and an age counter 164.

The connection identifier 154 holds a value for uniquely identifying the associated virtual connection or ME. The valid field 156 indicates whether the associated connection is valid or invalid. The generate timer 160 holds a decrementing count, which, upon reaching zero, signals generation of a CC message for the associated connection. The receiver timer 162 holds a decrementing count which, upon reaching zero, signals expiration of an interval during which a CC message from the remote MEP of the associated connection was expected, but not detected. The incrementing count within the age counter 164 corresponds to a number of consecutive CC messages that were expected but not received from the remote MEP of the associated connection. The interval field 158 holds a code that maps to values that are initially preloaded and subsequently reloaded into the generate timer and receiver timer fields 160, 162 for the associated connection.

During operation, upon each clock cycle, the state machine 110 accesses one of the virtual connections in the data structure 150, stepping through the list of connections in round-robin fashion. For example, consider that the data structure has 2000 entries corresponding to 2000 different virtual connections and that the state machine operates at 200 MHz. Accordingly, the state machine 110 takes 10 us (2000 connections/2M cycles/sec) to step through every connection in the data structure 150; that is, the state machine 110 accesses each entry 152 in the data structure 150 periodically, once every 10 us. In one embodiment, the data structure 150 has a fixed number of connections 138, which is determinative of the amount of time that the CCM state machine 110 takes to access every connection in the list once. In another embodiment, the data structure 150 is not fixed in its number of entries, and a variable delay can be added (e.g., at the beginning of the list or at the end) to ensure that each connection is accessed at the desired rate. For instance, if the data structure has 1000 entries and the state machine operates at a 200 MHz clock cycle, the state machine takes 5 us to step through all of the entries. If 10 us is the desired rate, a 5 us delay can be added to the process.

Figure 7:
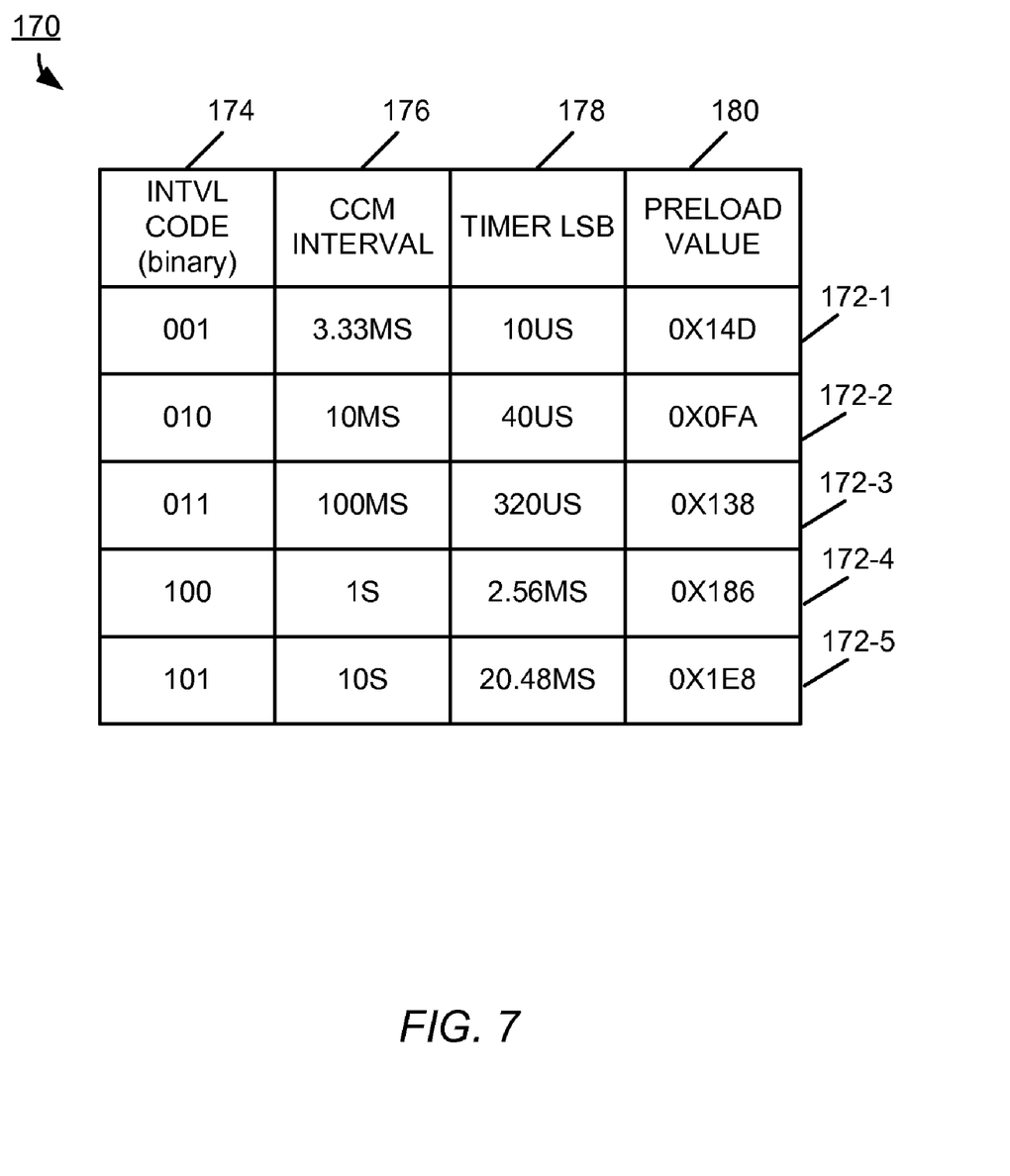
FIG. 7 is a table of example associations among interval codes, CCM interval durations, and timer preload values.

FIG. 7 shows an example of a table 170 having five entries 172-1, 172-2, 172-3, 173-4, and 172-5 that each associates an interval code 174 with a CC message interval 176, a decrement rate (timer LSB) 178, and a preload value 180. One of the five different interval codes 174 is stored in the interval field 158 for each connection in the data structure 150. The state machine 110 uses the interval code 174 assigned to a given connection to determine which one of the strobe signals 136, if any, applies to that connection.

As shown in FIG. 7, the table 170 has a different interval code 174 for each different CCM interval of 3.33 ms, 10 ms, 100 ms, 1 s, and 10 s, but excludes interval codes for 1 minute and 10 minutes. Such CC messaging intervals for such CC messages are sufficiently long for software executing at the CP card 60 to process. The accelerated processing achieved by the state machine and cooperating hardware at the line card 62 is not critical for such relatively long messaging intervals. Notwithstanding, interval codes can be established for these and other CCM intervals.

The interval code 174 assigned to a given connection also determines the preload values written initially, and upon each reset, to the generate timer and receive timer fields 160, 162 for the connection. The particular preload values shown in FIG. 7 are designed to achieve, in conjunction with the strobe signals, the corresponding CCM interval for the above-described embodiment in which the state machine 110 accesses each connection entry in the list once every 10 us. The preload values can differ for embodiments in which the state machine operates at a different clock rate (e.g., 250 MHz), is configured to access each connection entry at a rate other than 10 us (e.g., because there are more or fewer than 2000 connections in the list of connections), or uses different strobe rates from the four aforementioned strobe rates.

For example, the state machine 110 relates the interval code of 010 (binary) to the 40 us strobe signal. The preload value initially written to the generate timer 160 and to the receive timer 162 for a connection assigned the interval code value of 010 is 0x0FA hex (or 250 in decimal). The values in the generate timer and receive timer 160, 162 decrement by one every 40 us. Accordingly, the counts in the generate timer and receive timer fields decrement from their preload values to zero in 10 ms, which corresponds to the 10 ms CCM interval associated with that connection. (It is to be understood that instead of decrementing by one, other embodiments can be configured to increment by one or more, or to decrement by more than one.)

As another example, the interval code value of 001 (binary) corresponds to a 3.33 ms CCM messaging interval. The preload values of connections assigned the interval code value of 001 is 0x14D hex (i.e., 333 decimal). Each timer field 160, 162 is preloaded with the value of 333, and decrements by one every 10 us (3.33 ms/333). No strobe signal is used for this CCM messaging interval because the state machine accesses each connection once every 10 us, and thus a 10 us strobe signal is not needed to control whether the state machine examines and decrements the timer values. The counts in the generate timer and receive timer decrement from their preload values to zero in 3.33 ms.

Figure 8:
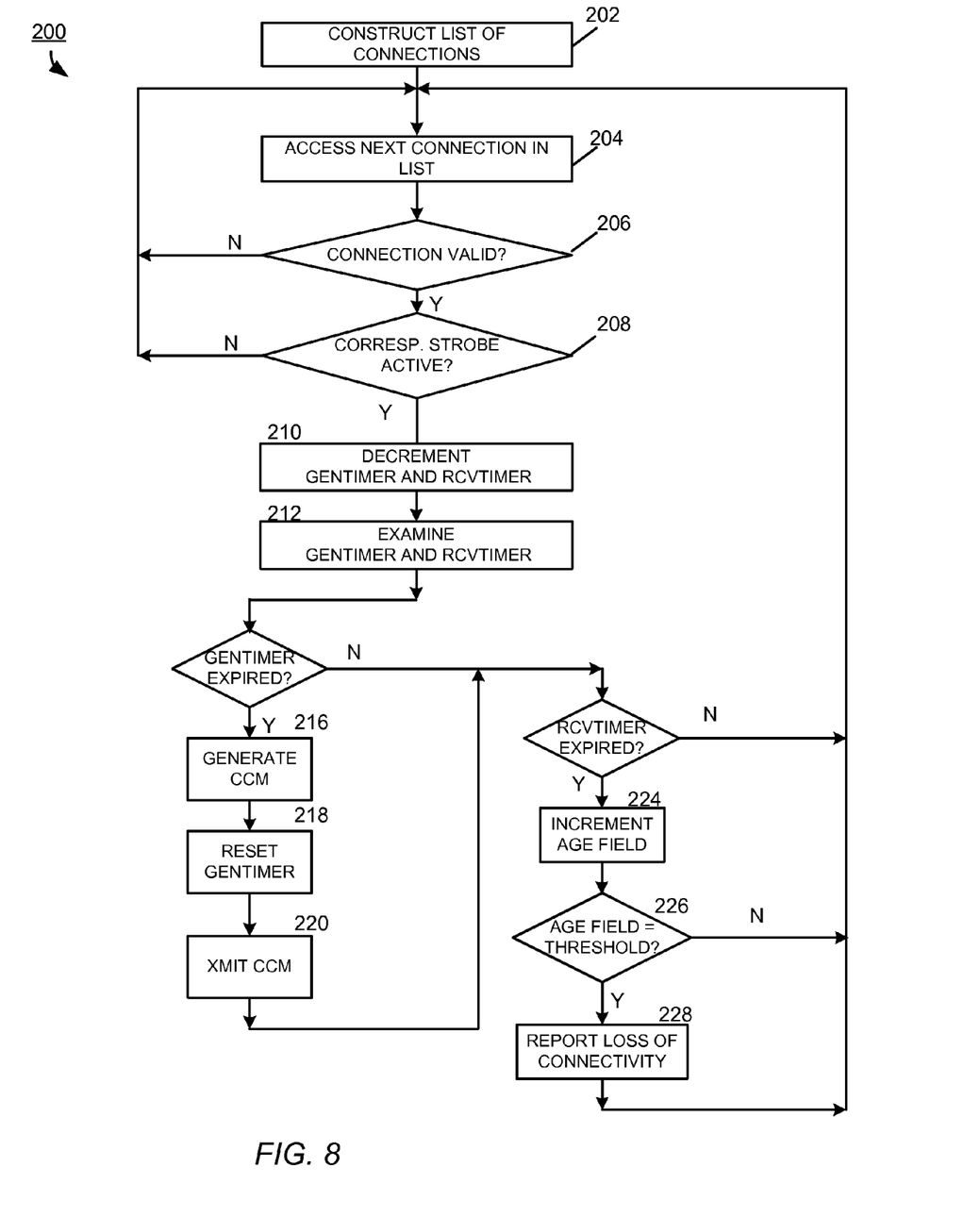
FIG. 8 is a flow diagram of an embodiment of a process for managing connections between MEPs.

FIG. 8 shows an embodiment of a process 200 for generating outgoing CC messages and checking incoming CC messages. The particular order of steps in FIG. 8 is but one illustration of the process 200; some of the actions taken by the CCM state machine 110 can occur concurrently or in a different order from that described. At step 202, the CP card constructs the list of connections 138 (one list for each line card 62), by determining the CC message interval for each connection when that connection is established. For each connection, the CP card 60 provides an interval code 158, flags the connection as valid, and writes the associated preload values to the generate timer and receive timer fields 160, 162. The list of connections 138 passes to the line card 62 for which it is prepared, where it is locally stored in the memory 126 in a data structure 150. In one embodiment, the CP card 60 keeps track of each connection in the list for each line card and determines whether to add or invalidate connections in the list.

During the process 200, the CCM state machine 110 of a given line card steps through, in round robin fashion, the connections in the list of connections 138. The CCM state machine 110 accesses (204) the first connection in the list of connections. To determine whether to examine the generate timer and receiver timer fields of the connection, the state machine 110 checks (206) if the connection is valid and if the appropriate strobe signal, based on the interval code, is asserted (208).

If the connection is either invalid or the associated strobe signal is not asserted, the state machine 110 advances (204) to the next connection in the list. If the presently accessed connection is the last connection in the list, the state machine 110 returns to the first connection in the list. Otherwise, the state machine 110 decrements (210) the generate timer 160 and the receive timer 162 for the connection.

The state machine 110 examines (212) the present value in the generate timer field 160 and receive timer field 162 for the connection. A non-zero value in the generate timer field 160 indicates that the generate timer has not expired, whereas a zero value indicates expiration. Upon expiration of the generate timer, the state machine 110 initiates generation (216) of a CC message for this connection. The value in the generate timer field is reset (218) to the preload value. In addition, the CC message is forwarded (220) towards its destination MEP through an appropriate Ethernet port 68.

Similarly to the generate timer, a non-zero value in the receive timer field 162 indicates that the receive timer has not expired, whereas a zero value indicates expiration. If the receive timer 162 has not expired, the state machine 110 advances (204) to the next connection in the list. If, instead, the receive timer field 162 has expired, the state machine 110 increments by one (224) the count in the age counter 164. If the count in the age counter 164 consequently reaches (226) a predefined threshold (e.g., 3), then the state machine 110 declares (228) a loss of continuity for the connection, and initiates a reporting of the continuity loss to the CP card 60 in an exception packet. Otherwise, the state machine 110 advances (204) to the next connection in the list.

In the generation of the exception packet, the state machine 110 acquires a template frame (e.g., from the template memory 128) and sends the template frame to the network processor 106. The template frame includes the ME index, thereby identifying the connection for which continuity has been lost. The network processor 106 adds any additional information to the template frame to complete building the exception packet. The network processor also encapsulates the exception packet for transport across the switch fabric to the CP card 60. The state machine 110 subsequently advances (204) to the next connection in the list.

The following pseudo code generally outlines the process 200 described in FIG. 8:

```
For n = 1 to 2048 Do
  Begin
    Read Slot n;
    Case INTERVAL of
      001: decrement GenTimer, RcvTimer;
      010: If 40us_strobe then decrement GenTimer, RcvTimer;
      011: If 320us_strobe then decrement GenTimer, RcvTimer;
      100: If 2.56ms_strobe then decrement GenTimer, RcvTimer;
      101: If 20.48ms_strobe then decrement GenTimer, RcvTimer;
    END Case
```

```
    IF GenTimer = 0x000 THEN
      Begin
        Generate_Template_Packet;
        Reload Timer according to INTVL field;
      End
    IF RcvTimer = 0x000 THEN
      Begin
        Increment Age Count;
        If Age Count = 3 THEN
          Generate_Exception_Packet;
      End
END For Loop
```

Figure 9:
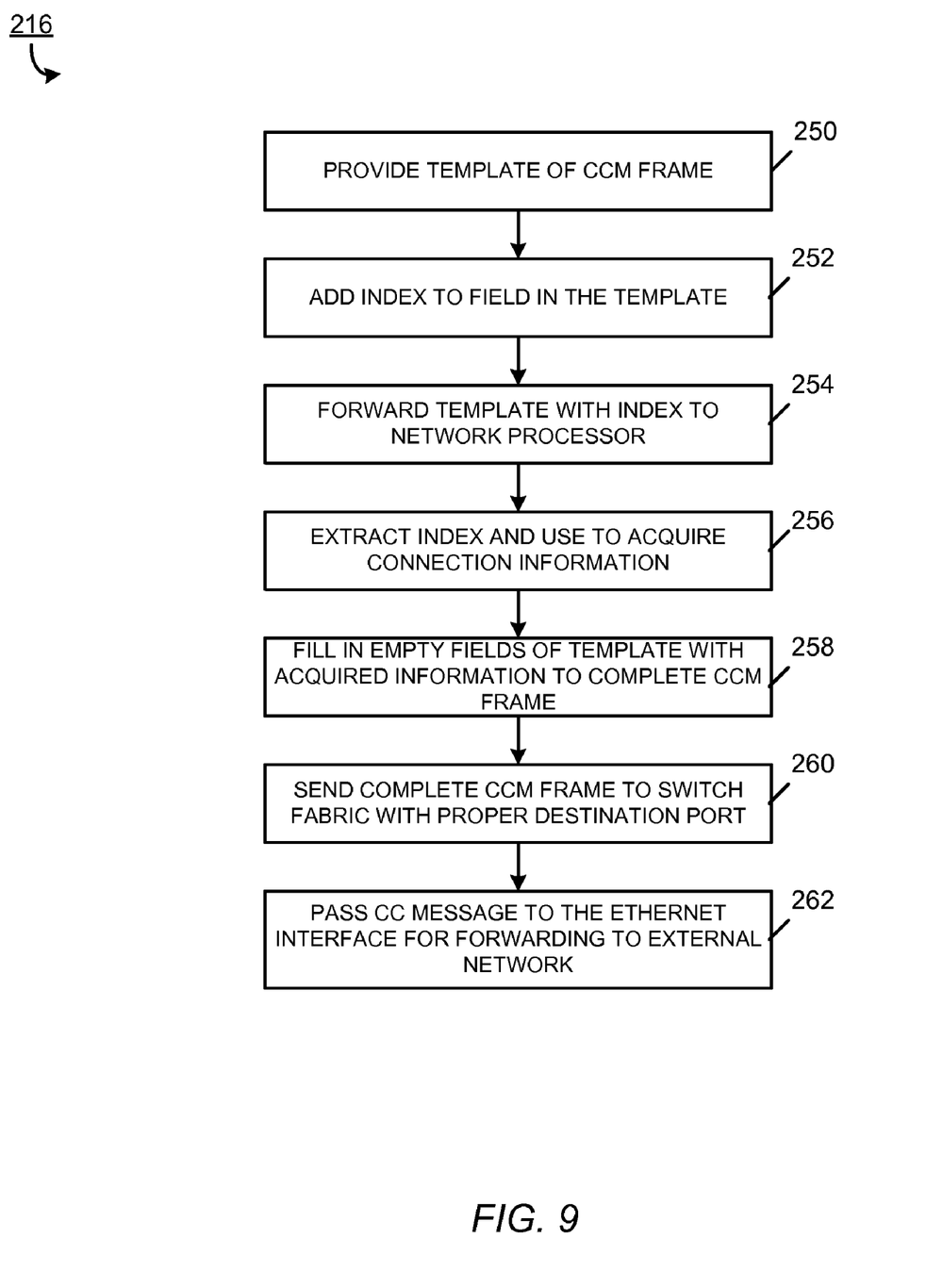
FIG. 9 is a flow diagram of an embodiment of a process for generating one or more CC messages for a connection.
Figure 10:
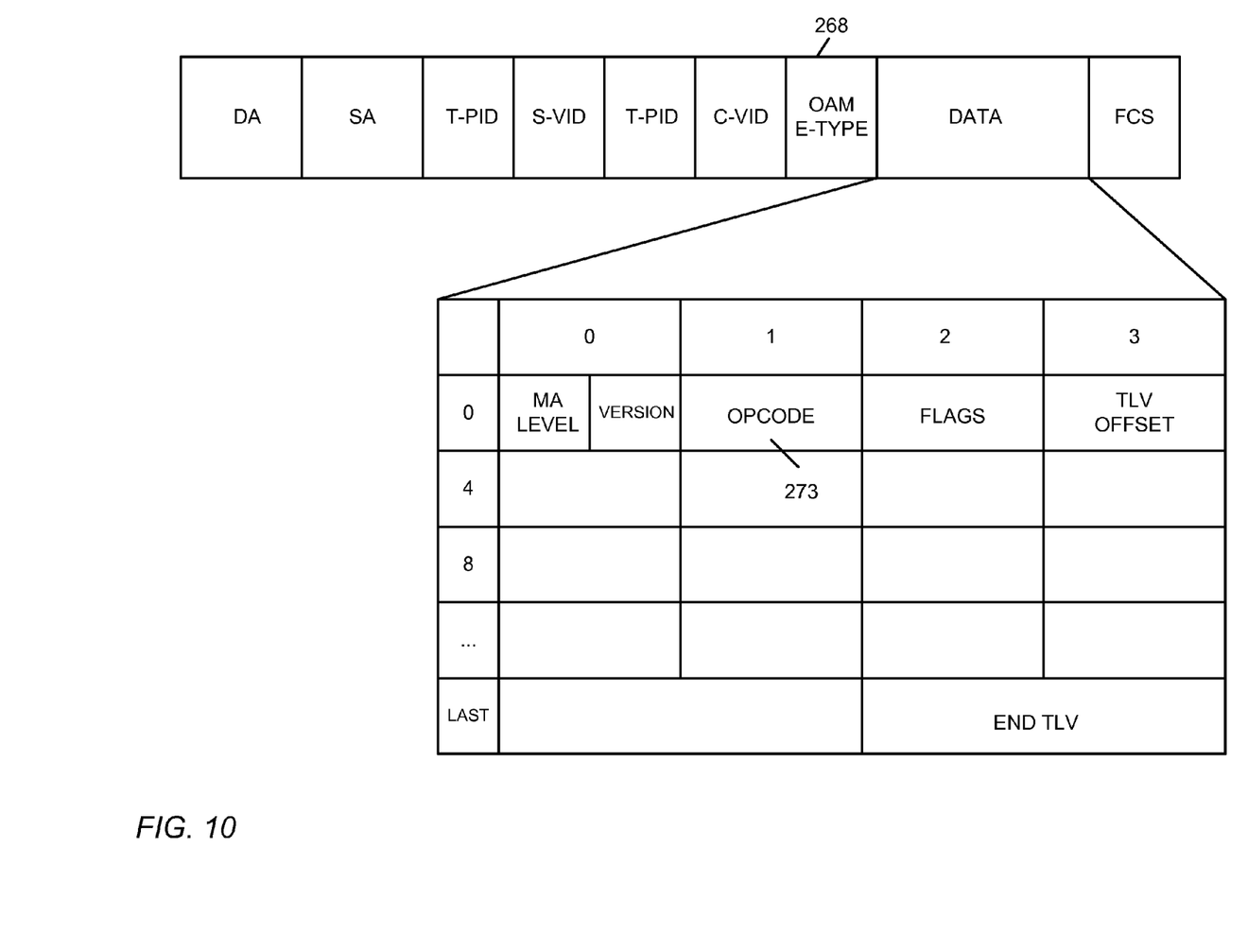
FIG. 10 is a diagram of an IEEE 802.1ag frame format for uses in the generating of CC messages.

FIG. 9 shows an embodiment of a process 216 (FIG. 8) of generating a CC message. In the description of the process 216, reference is also made to FIG. 4 and to FIG. 5. When a generate timer 160 associated with a valid connection decrements to zero, the CCM state machine 110 generates (250) a template frame for a CC message for forwarding to the network processor 106. More specifically, the state machine 110 sends a load command to the logic 130, and the logic 130 acquires the template frame from the template memory 128. FIG. 10 shows an example format for the template frame, which is a standard 802.1 ag OAM frame format.

Returning to FIG. 9, the logic 130 adds (252) an ME index identifying the connection to the template frame (in one of the fields of the OAM frame format) and forwards (254) the partially filled template frame to the network processor 106. The network processor 106 uses the ME index passed along in the template frame to access (256) connection information from a data structure. This data structure maintains a correspondence between ME indices and connection information about each destination MEP in the ME, for example, the destination address (DA), source address (SA), VID (VLAN ID), for the MEP. After acquiring the connection information, the network processor 106 completes (258) a CC message for each MEP by filling in the remaining fields of the template frame and forwards (260) each completed CC message to the switch fabric 66 with an appropriate destination Ethernet port. Each completed CC message returns from the switch fabric 66 and passes (262) to the physical Ethernet interface 102 (through the state machine 110) for forwarding to the external network through the destination Ethernet port.

Figure 11:
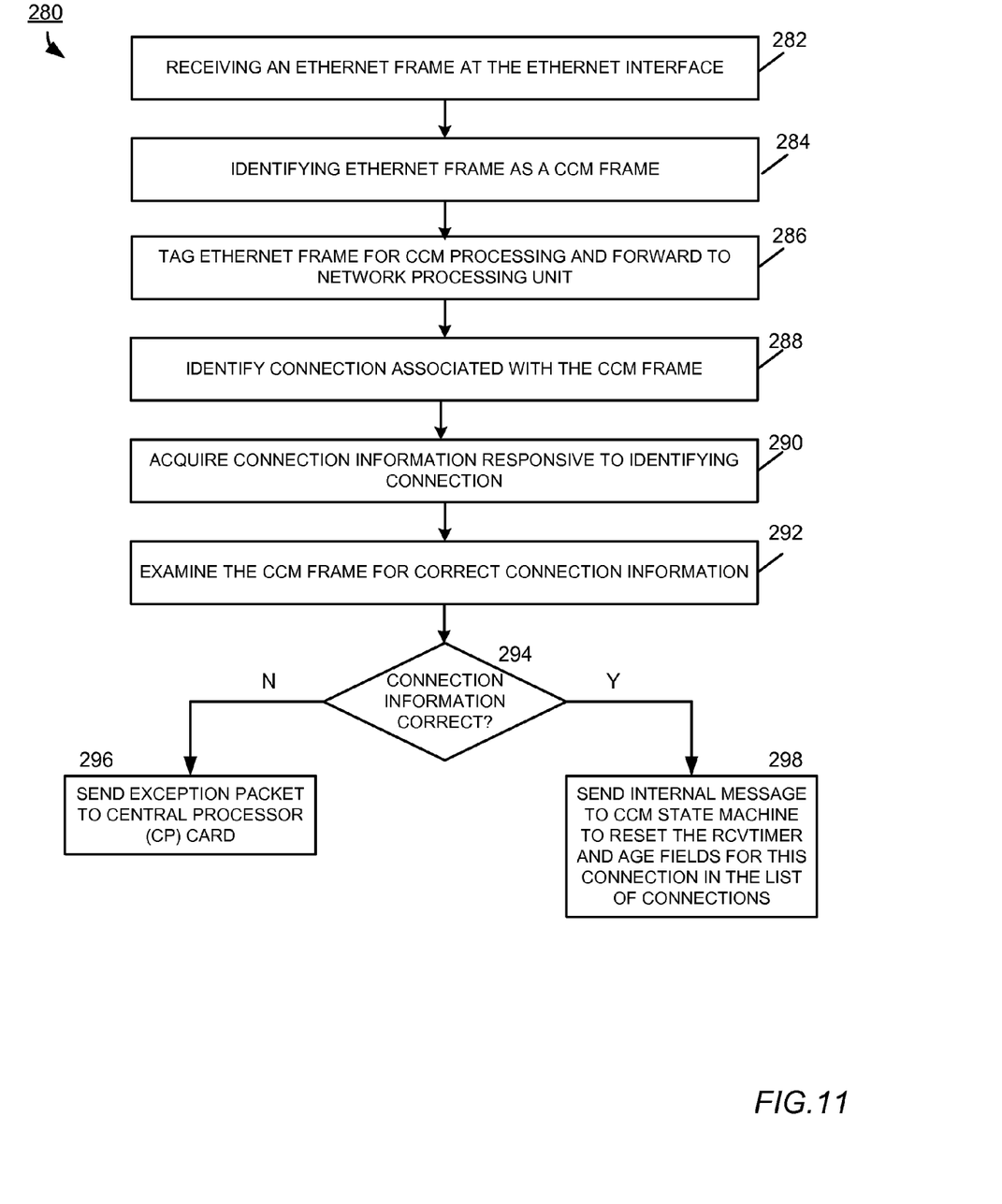
FIG. 11 is a flow diagram of an embodiment of a process for examining an incoming CC message.

FIG. 11 shows an embodiment of a process 280 for receiving and checking an incoming CC message. At step 282, an Ethernet frame (or packet) arrives at the Ethernet interface 102 of one of the Ethernet ports 68. From the OAM E-type 268 and Opcode 273 fields of the Ethernet frame, the frame analyzer 104 determines (284) that the Ethernet frame is a CC message. The frame analyzer 104 sends (286) the Ethernet frame to the network processor 106, signifying that the frame is to undergo CC message reception processing.

At step 288, the network processor 106 performs a hash of the source address, destination address, and VLAN ID to acquire an ME index. The network processor 106 then uses the ME index to access (290) a database that contains connection information for the corresponding ME. Using this connection information, the network processor 106 examines (292) the CC message to determine if the MA level, the MA ID, and the MEP ID are correct. If the comparisons fail (294), the network processor 106 sends (296) an exception packet to the CP card 60.

Alternatively, if the comparisons pass (294), the network processor sends an internal message (FIG. 5) to the CCM state machine 110. In general, the internal message operates to cause the CCM state machine 110 to reset (298) the receive timer field (to the associated preload value) and the age counter (to 0) of the entry 152 corresponding to the connection associated with the CC message. In one embodiment, the internal message maps to a specific memory location. The decode logic 122 (FIG. 5) decodes this memory location as a reset command. Decoding the internal message also provides the ME index so that the CCM state machine 110 can determine the connection for which to reset the receive timer and age counter.

Program code (or software) of the present invention may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and Visual C++.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Further, although described predominantly as software, embodiments of the described invention may be implemented in hardware (digital or analog), software, or a combination thereof.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of real-time processing of a connectivity check message, the method comprising:
   receiving an Ethernet frame over a network by a line card of a network element disposed at an edge of an Ethernet connectivity fault management (CFM) domain;
   determining, by the line card, that the Ethernet frame includes a continuity check message;
   examining, by the line card, the continuity check message to determine whether the continuity check message contains correct connection information;
   maintaining, by the line card, a list of connections in the Ethernet CFM domain supported by the line card;
   associating, by the line card, a receive timer with each connection in the list of connections;
   generating, by the line card, an index into the list of connections based on information contained in the continuity check message;
   identifying a connection in the list of connections based on the index; and
   resetting, by the line card, the receive timer associated with the identified connection to a preload value in response to the continuity check message containing correct information for that connection.

2. The method of claim 1, further comprising:
   determining, by the line card, a connection error in response to examining the continuity check message; and
   sending an exception message from the line card through a switch fabric to a central processor card of the network element to report the connection error.

3. The method of claim 1, further comprising:
   associating, by the line card, an age counter with each connection in the list of connections;
   incrementing, by the line card, the age counter associated with a given connection whenever the receive timer for the given connection expires; and
   sending, by the line card, an exception message through a switch fabric to a central processor card of the network element if a count in the age counter associated with the given connection reaches a threshold value.

4. A method of real-time generation of a connectivity check message, the method comprising:
   maintaining, by a line card in a network element, a list of connections in an Ethernet connectivity fault management (CFM) domain that are supported by the line card;
   associating, by the line card, a generate timer and a receive timer with each connection in the list of connections;
   accessing, by the line card, each connection in the list of connections by stepping through the list in round robin fashion, one connection during each clock cycle;
   decrementing, by the line card, the generate timer and the receive timer for a given connection currently being accessed; and
   generating, by the line card, a continuity check message for the given connection currently being accessed if the generate timer associated with the given connection expires as a result of the decrementing.

5. The method of claim 4, wherein generating the continuity check message for the given connection comprises:
   generating a template for the continuity check message, the template having one or more fields filled with information and one or more empty fields to be filled by a network processor operating on the line card;
   transmitting the template for the continuity check message and an index value to the network processor;
   acquiring, by the network processor, connection information for the given connection using the index value to access memory storing the connection information; and
   filling, by the network processor, the empty fields in the template with the acquired connection information to complete the continuity check message.

6. The method of claim 4, further comprising:
   associating a time interval with each connection in the list of connections;
   initially loading the generate timer associated with the given connection with a value representative of the time interval associated with the given connection; and
   reloading the generate timer associated with the given connection with the timer interval associated with the given connection after generating the continuity check message for the given connection.

7. The method of claim 4, further comprising:
   associating a strobe rate with the given connection in the list of connections;
   issuing a strobe signal at the strobe rate; and
   wherein decrementing the generate timer for the given connection occurs when the issuing of a strobe signal coincides with the accessing of the given connection.

8. A network element comprising:
   a switch fabric;
   a central processor (CP) card; and
   a line card in communication with the CP card through the switch fabric, the line card including an Ethernet interface for transmitting and receiving Ethernet connectivity fault management (CFM) frames over a network, memory, and circuitry configured to generate new continuity check messages, to process continuity check messages received on each connection supported by the line card, and to detect any loss of continuity for the connections supported by the line card, the circuitry comprising a network processor configured to generate an index based on information contained in a continuity check message received by the line card, the memory storing a list of connections in a Ethernet CFM domain supported by the line card, each connection in the list of connections being associated with a generate timer and a receive timer, and wherein the circuitry provides a state machine that is in communication with the memory to access a connection in the list of connections based on the index.

9. The network element of claim 8, wherein the line card further comprises circuitry for determining whether an Ethernet CFM frame received by the line card includes a continuity check message.

10. The network element of claim 8, wherein the network processor examines a continuity check message received by the line card to determine whether the continuity check message contains correct connection information.

11. The network element of claim 10, wherein the network processor is configured to prepare and send an exception message to the CP card through the switch fabric upon detecting a connection error in response to examining the continuity check message.

12. The network element of claim 8, wherein the state machine is configured to increment an age counter associated with a given connection when the receive timer for the given connection expires, and to initiate generation of an exception message if a count in the age counter associated with the given connection reaches a threshold value.

13. The network element of claim 8, wherein the state machine is configured to access each connection in the list of connections by stepping through the list in round robin fashion, one connection during each clock cycle, to decrement the generate timer for a given connection currently being accessed, and to generate a continuity check message for the given connection currently being accessed if the generate timer associated with the given connection expires as a result of the decrementing.

14. The network element of claim 13, wherein a time interval is associated with each connection in the list of connections, the generate timer and receive timer associated with the given connection being initially loaded with a value corresponding to the time interval associated with the given connection, the generate timer associated with the given connection being reloaded with the value corresponding to the timer interval associated with the given connection after the line card generates the continuity check message for the given connection.

15. The network element of claim 8, wherein the line card further comprises memory storing a template for a continuity check message, the template having one or more empty fields, and wherein the state machine is configured to forward the template to the network processor with an index value, and the network processor is configured to use the index value to acquire connection information for the given connection and to fill the one or more empty fields in the template.

16. The network element of claim 8, wherein the line card further comprises a strobe generator issuing a strobe signal at a strobe rate, and wherein the strobe rate is associated with the given connection in the list of connections and the state machine is configured to decrement the generate timer and the receive timer for the given connection when the strobe generator issues a strobe signal coincidently with when the state machine accesses the given connection.

* * * * *